(12) United States Patent
Nirmale et al.

(10) Patent No.: US 12,210,486 B1
(45) Date of Patent: Jan. 28, 2025

(54) DATA ASSIGNMENT TO SIM-GROUPS USING FINGERPRINT DISTRIBUTION MAPPING

(71) Applicant: Dell Products L.P., Round Rock, TX (US)

(72) Inventors: Sandeep Nirmale, Santa Clara, CA (US); Yubing Wang, Southborough, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/396,158

(22) Filed: Dec. 26, 2023

(51) Int. Cl.
*G06F 16/17* (2019.01)
*G06F 16/14* (2019.01)
*G06F 16/174* (2019.01)

(52) U.S. Cl.
CPC ........ *G06F 16/1752* (2019.01); *G06F 16/152* (2019.01)

(58) Field of Classification Search
None
See application file for complete search history.

(56) References Cited

U.S. PATENT DOCUMENTS

| 11,675,816 | B1 * | 6/2023 | Chandrasekharan ....... G06F 11/3082 707/737 |
| 2017/0288989 | A1 * | 10/2017 | Sinha ............ G06F 16/35 |
| 2020/0233597 | A1 * | 7/2020 | Beskales ............ H03M 7/3091 |
| 2021/0191640 | A1 * | 6/2021 | Ponnala ............ G06F 3/0641 |

* cited by examiner

*Primary Examiner* — Augustine K. Obisesan
(74) *Attorney, Agent, or Firm* — Chamberlain, Hrdlicka, White, Williams & Aughtry; Aly Dossa

(57) ABSTRACT

A method for assigning data to similarity groups (sim-groups). The method includes: partitioning a data stream, originating from a data source, into stream chunks; for at least a first stream chunk of the stream chunks: initializing a first chunk bin-map for the first stream chunk; partitioning the first stream chunk into first chunk segments; updating the first chunk bin-map based on a chunk segment processing of the first chunk segments; computing, to obtain a first similarity distance set, a similarity distance between the first chunk bin-map and each sim-group bin-map in a first set of sim-group bin-maps; identifying a first sim-group corresponding to a first similarity distance in the first similarity distance set; and assigning the first stream chunk to the first sim-group.

18 Claims, 13 Drawing Sheets

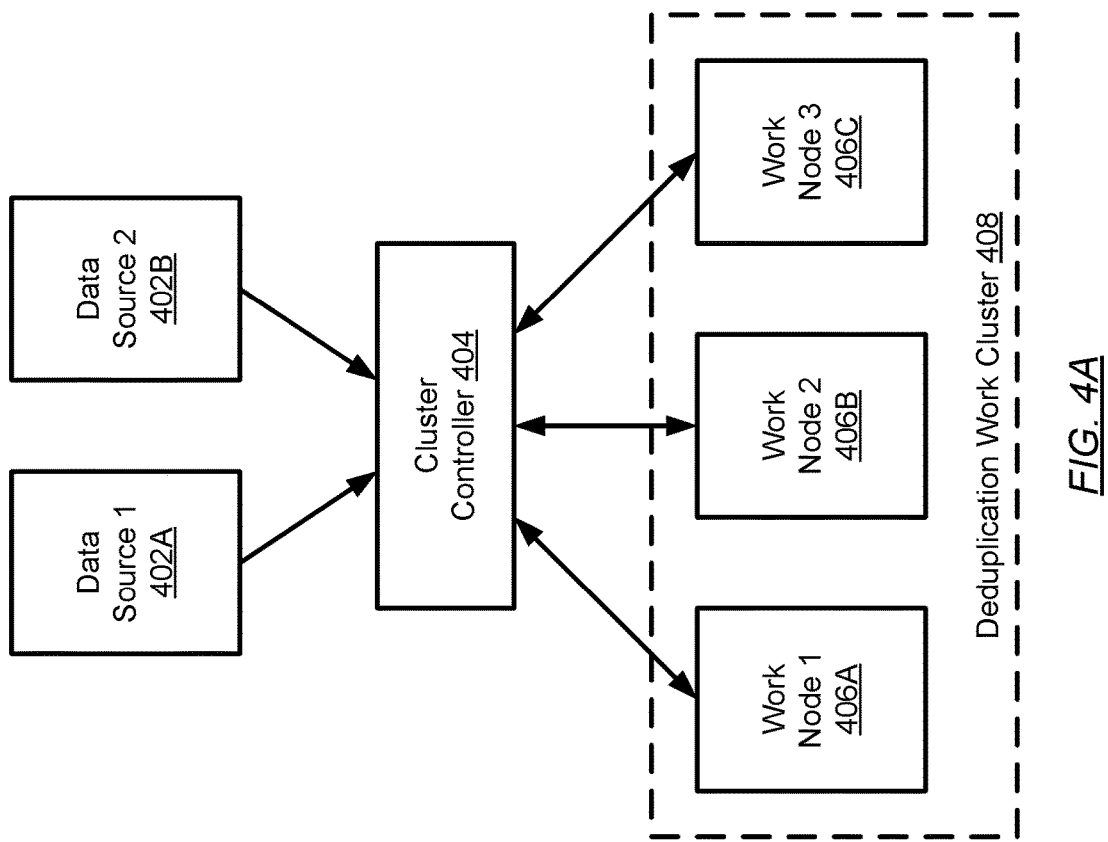

DATA ASSIGNMENT TO SIM-GROUPS USING FINGERPRINT DISTRIBUTION MAPPING

BACKGROUND

In a scaled-out data deduplication architecture, there are multiple nodes implementing multiple deduplication domains (which may also be referred to as similarity groups, or sim-groups), respectively. Any data, in order to undergo data deduplication processing at one of these multiple nodes, may be directed or assigned thereto based on a number of factors.

SUMMARY

In general, in one aspect, embodiments described herein relate to a method for assigning data to similarity groups (sim-groups). The method includes: partitioning a data stream, originating from a data source, into stream chunks; for at least a first stream chunk of the stream chunks: initializing a first chunk bin-map for the first stream chunk; partitioning the first stream chunk into first chunk segments; updating the first chunk bin-map based on a chunk segment processing of the first chunk segments; computing, to obtain a first similarity distance set, a similarity distance between the first chunk bin-map and each sim-group bin-map in a first set of sim-group bin-maps; identifying a first sim-group corresponding to a first similarity distance in the first similarity distance set; and assigning the first stream chunk to the first sim-group.

In general, in one aspect, embodiments described herein relate to a non-transitory computer readable medium (CRM). The non-transitory CRM includes computer readable program code, which when executed by a computer processor, enables the computer processor to perform a method for assigning data to similarity groups (sim-groups). The method includes: partitioning a data stream, originating from a data source, into stream chunks; for at least a first stream chunk of the stream chunks: initializing a first chunk bin-map for the first stream chunk; partitioning the first stream chunk into first chunk segments; updating the first chunk bin-map based on a chunk segment processing of the first chunk segments; computing, to obtain a first similarity distance set, a similarity distance between the first chunk bin-map and each sim-group bin-map in a first set of sim-group bin-maps; identifying a first sim-group corresponding to a first similarity distance in the first similarity distance set; and assigning the first stream chunk to the first sim-group.

In general, in one aspect, embodiments described herein relate to a system. The system includes: a data source configured to continuously transmit data as a data stream; and a cluster controller operatively connected to the data source, and including a computer processor configured to perform a method for assigning the data to similarity groups (sim-groups). The method includes: receiving the data stream from the data source; partitioning the data stream into stream chunks; for at least a first stream chunk of the stream chunks: initializing a first chunk bin-map for the first stream chunk; partitioning the first stream chunk into first chunk segments; updating the first chunk bin-map based on a chunk segment processing of the first chunk segments; computing, to obtain a first similarity distance set, a similarity distance between the first chunk bin-map and each sim-group bin-map in a first set of sim-group bin-maps; identifying a first sim-group corresponding to a first similarity distance in the first similarity distance set; and assigning the first stream chunk to the first sim-group.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIGS. 4A-4H show an example scenario in accordance with one or more embodiments described herein.

DETAILED DESCRIPTION

Figure 1:
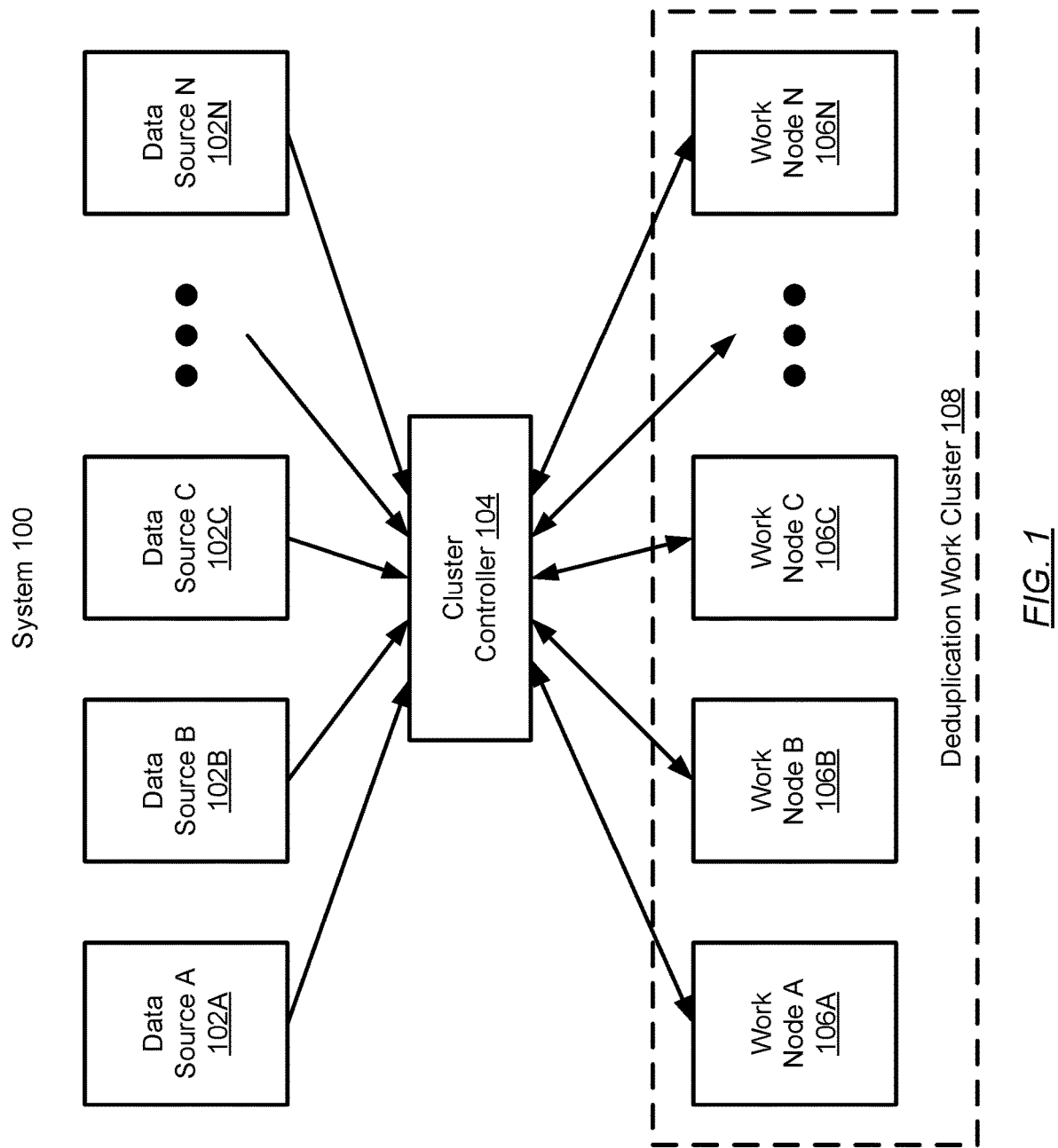
FIG. 1 shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to performing data assignment to sim-groups using fingerprint distribution mapping. For context, in a scaled-out data deduplication architecture, there are multiple nodes implementing multiple deduplication domains (also referred to herein as similarity groups, or sim-groups), respectively. Any data, in order to undergo data deduplication processing at one of these multiple nodes, may be directed or assigned thereto based on a number of factors. The key objective, nevertheless, lies with the distribution of said data across the multiple sim-groups to achieve a balance between optimal global data deduplication efficiency and node workloads there-throughout.

Embodiments described herein propose a sim-group assignment algorithm, which at least reflects the following: (a) a probabilistic technique that employs fingerprint distribution maps (or bin-maps) to assign data chunks to appropriate sim-groups in order to achieve optimal data deduplication efficiencies; (b) an inline or online machine learning based clustering algorithm, which handles dynamic, streaming data (rather than static datasets) and balances the sought optimization of data deduplication efficiencies with other considerations, such as node workloads; (c) a reinforcement learning technique that seeks to assign data to sim-groups corresponding to nodes exhibiting lesser workloads; (d) a reinforcement learning technique that seeks to assign data to sim-groups corresponding to nodes maintaining spatial locality data access behavior; and (e) a reinforcement learning technique that seeks to assign data to sim-groups based on an epsilon (ε)—greedy action selection algorithm.

FIG. 1 shows a system in accordance with one or more embodiments described herein. The system (100) may include one or more data sources (102A-102N), a cluster controller (104), and two or more work nodes (106A-106N). Each of these system (100) components is described below.

In one or many embodiment(s) described herein, any data source (102A-102N) may represent a physical (or a virtual) appliance or device wherefrom data sought to undergo data deduplication originates. As such, any data source (102A-102N) may, at least in part, be configured to receive, generate, process, store, and/or transmit data, as well as provide an environment in which any number of computer programs may execute or be maintained thereon. The computer program(s) may, for example, implement one or more services offered locally or over a network. Further, in providing an execution environment for any computer program(s) installed thereon, any data source (102A-102N) may include and allocate various resources (e.g., computer processors, memory, storage, virtualization, network bandwidth, etc.), as needed, to the computer program(s) or any other process(es). One of ordinary skill, however, will appreciate that any data source (102A-102N) may perform other functionalities without departing from the scope of the embodiments described herein. Examples of any data source (102A-102N) may include, but are not limited to, a desktop computer, a laptop computer, a network server, a tablet computer, a smartphone, a virtual machine, a container, a micro-service, or any other computing device (or a virtualization thereof) similar to the computing system illustrated and described with respect to FIG. 3, below.

In one or many embodiment(s) described herein, the cluster controller (104) may represent any information technology (IT) infrastructure at least configured to assign data, received from any data source (102A-102N), to an appropriate work node (106A-106N) for data deduplication processing. To that end, the cluster controller (104) may include functionality to perform data assignment to sim-groups using fingerprint distribution mapping—the method for doing so being illustrated and described below with respect to FIGS. 2A-2E. One of ordinary skill, however, will appreciate that the cluster controller (104) may perform other functionalities without departing from the scope of the embodiments described herein.

In one or many embodiment(s) described herein, the cluster controller (104) may be implemented through on-premises infrastructure, cloud computing infrastructure, or any hybrid infrastructure thereof. The cluster controller (104), accordingly, may be implemented using one or more network servers (not shown), where each network server may represent a physical or a virtual network server. Additionally, or alternatively, the cluster controller (104) may be implemented using one or more computing devices similar to the computing system illustrated and described with respect to FIG. 3, below.

In one or many embodiment(s) described herein, any work node (106A-106N) may represent a physical (or a virtual) appliance or device whereon data assigned thereto undergoes data deduplication. As such, any work node (106A-106N) may, at least in part, be configured to: provide an execution environment wherein one or more computer programs (or processes) may implement any data deduplication process; receive any number of data chunks from the cluster controller (104) to undergo data deduplication; and provide, when requested by or periodically pushed to the cluster controller (104), various state and/or performance metrics (e.g., data deduplication efficiency, computer processor utilization, input-output (IO) operations per second (IOPS), data access latency, etc.) concerning itself. One of ordinary skill, however, will appreciate that any work node (106A-106N) may perform other functionalities without departing from the scope of the embodiments described herein.

For example, in one or many embodiment(s) described herein, any work node (106A-106N) may, at least in part, include functionality to store or maintain any deduplicated data thereon or on any underlying hardware. As such, any work node (106A-106N) may include or have access to physical storage wherein at least the deduplicated data may reside. Said physical storage may encompass non-transitory computer readable media on which at least the deduplicated data may be stored in whole or in part, and temporarily or permanently. Further, said physical storage may, at least in part, be implemented using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, any work node (106A-106N) may implement, and thus correspond to, a deduplication (or dedupe) domain. Said dedupe domain (also referred to herein as a similarity group, or sim-group) may refer to an environment or a space where objects (e.g., stream chunks) assigned thereto may, at least in part, share the same object portions (e.g., chunk segments) there-between. Any dedupe domain, furthermore, may employ local data deduplication impacting solely any objects assigned and/or maintained on the work node (106A-106N) corresponding thereto. Moreover, any work node (106A-106N) may form part of a deduplication work cluster (108). The deduplication work cluster (108), in turn, may refer to distributed computing architecture configured to achieving the common goal of data deduplication efficiency optimization.

Examples of any work node (106A-106N) may include, but are not limited to, a desktop computer, a laptop computer, a network server, a tablet computer, a smartphone, a virtual machine, a container, a micro-service, or any other computing device (or a virtualization thereof) similar to the computing system illustrated and described with respect to FIG. 3, below.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components and/or subcomponents, other system (100) configurations may be used without departing from the scope of the embodiments described herein.

FIG. 2A-2E show a flowchart describing a method for performing data assignment to sim-groups using fingerprint distribution mapping in accordance with one or more embodiments described herein. The various steps outlined below may be performed by the cluster controller (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Figure 2A:
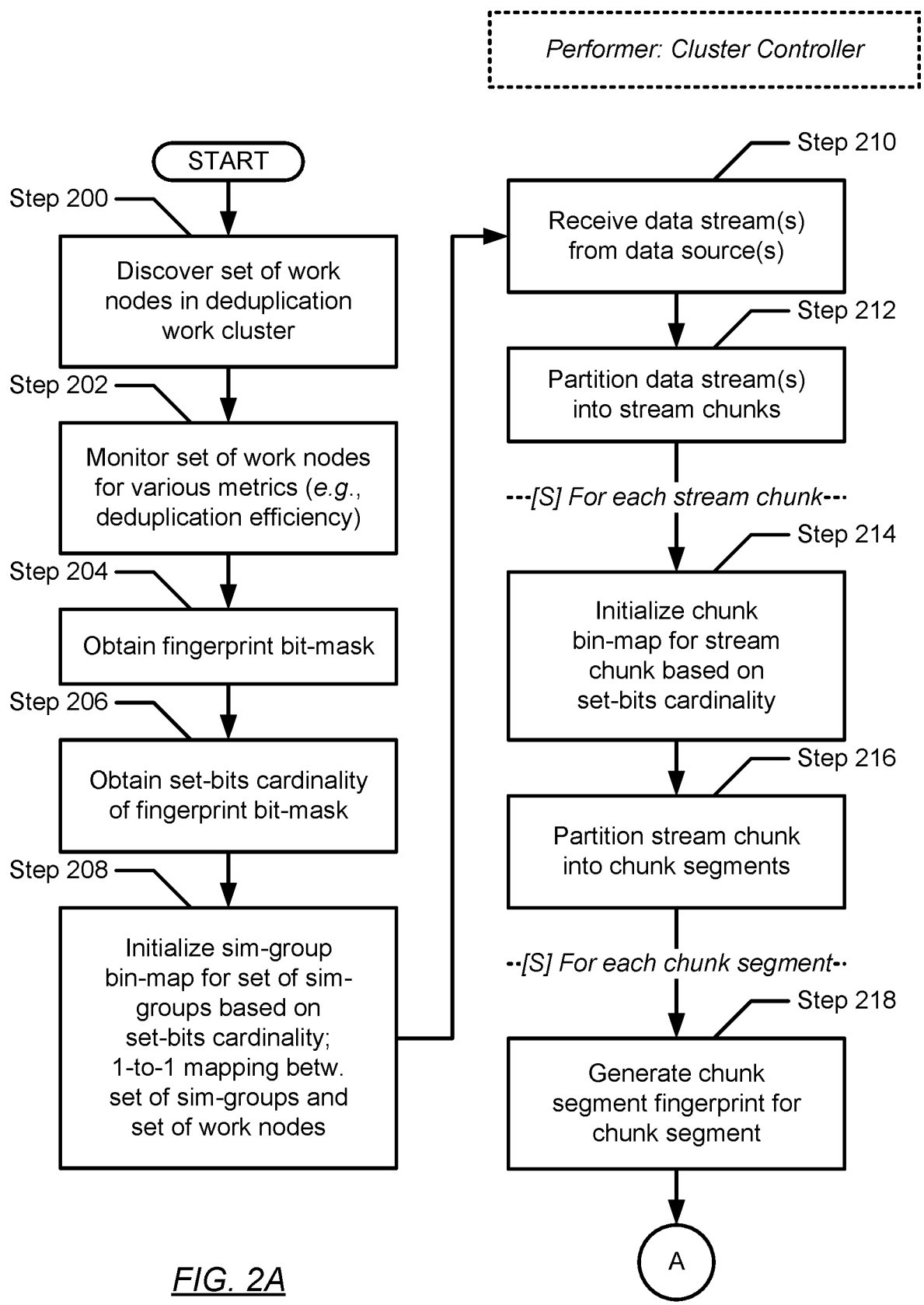
FIG. 2A-2E show a flowchart describing a method for performing data assignment to sim-groups using fingerprint distribution mapping in accordance with one or more embodiments described herein.

Turning to FIG. 2A, in Step 200, a set of work nodes is discovered. In one or many embodiment(s) described herein, each work node in the set of work nodes may form part of a deduplication work cluster and thus may refer to a physical (or a virtual) appliance or device whereon data assigned thereto undergoes data deduplication. Further, discovery of any work node may employ any existing device discovery techniques or protocols.

In Step 202, each work node, in the set of work nodes (discovered in Step 200), is monitored. In one or many embodiment(s) described herein, monitoring of any work node may, for example, entail deployment of an agent (i.e., a computer program or process) by the cluster controller onto the work node, where said agent may be configured to, whether on-demand (i.e., by request) and/or periodically push/provide, various state and metrics concerning the work node to the cluster controller. By way of examples, said various state and metrics may include: a data deduplication efficiency (or ratio); computer processor utilization; input-output (IO) operations per second (IOPS); and data access latency. Further, said various state and metrics are not limited to the aforementioned specific examples.

Figure 4B:
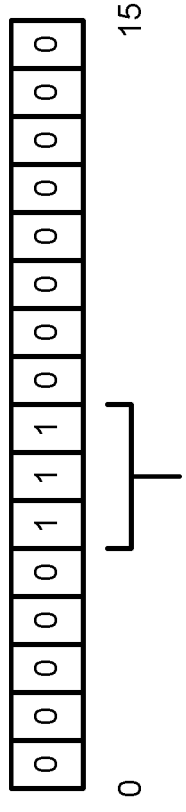

In Step 204, a fingerprint bit-mask is obtained. In one or many embodiment(s) described herein, the fingerprint bit-mask may refer to a sequence or an ordered series of binary bits (e.g., each binary bit representing a variable either reflecting a one (1) or a zero (0) value) of any arbitrary length. Said any arbitrary length, or cardinality of the fingerprint bit-mask, may match any arbitrary length or cardinality of a hash digest or value (also referred to herein as a fingerprint) outputted by a hash function (described more below). The fingerprint bit-mask, moreover, may serve (when applied by way of a bit-wise operation) to identify the value of one or more specific bits (amongst a target bit-field (e.g., the aforementioned fingerprint)) each aligned, in position, with one or more set-bits (defined below) amongst the fingerprint bit-mask. An example fingerprint bit-mask is illustrated and described with respect to FIG. 4B, below.

In Step 206, amongst the fingerprint bit-mask (obtained in Step 204), a set-bits cardinality of one or more set-bits expressed therein is obtained. In one or many embodiment(s) described herein, a set-bit of the fingerprint bit-mask may reference any binary bit therein reflecting a one (1) value. A set-bits cardinality, accordingly, may refer to a numerical value indicating a total number of set-bits present within the fingerprint bit-mask. By way of an example, with a fingerprint bit-mask of 11001001, the set-bits cardinality associated therewith is four (4) referencing the four binary bits each reflecting a one (1) value.

In Step 208, a set of sim-group bin-maps is initialized. In one or many embodiment(s) described herein, any sim-group bin-map may refer to a data structure (e.g., a vector or an array) that captures an approximate probability distribution of a superset of chunk segment fingerprints (described below—see e.g., Step 218) for chunk segments (described below—see e.g., Step 216) belonging to any stream chunk(s) (described below—see e.g., Step 212) assigned to a corresponding sim-group.

Any sim-group bin-map, accordingly, may be defined or described through: (a) a set of bins (e.g., vector/array elements), where the number of bins forming the set of bins may be derived from the set-bits cardinality (obtained in Step 206) or, more specifically, through the mathematical expression $2^C$, where C equals the set-bits cardinality; (b) a different C-bit value, from a set of possible C-bit values, associated with or mapped to each bin in the set of bins; and a separate bin value, associated with or mapped to each bin in the set of bins, where any bin value may represent a counter indicating a frequency of fingerprint bit selections (described below—see e.g., Step 222), for any stream chunk(s) assigned to a corresponding sim-group, that match the C-bit value associated with or mapped to a corresponding bin. An example sim-group bin-map is illustrated and described below with respect to FIG. 4C.

In Step 210, one or more data streams is/are received. In one or many embodiment(s) described herein, any data stream may refer to a continuous flow or transfer of data in any one or more formats (e.g., multimedia, text, image, video, audio, etc.). Further, each received data stream may originate, respectively, from a given data source (see e.g., FIG. 1).

In Step 212, data from the data stream(s) (received in Step 210) is partitioned into stream chunks. In one or many embodiment(s) described herein, any stream chunk across the data stream(s) may be of a predetermined, uniform size (e.g., four (4) MB). Further, any stream chunk may refer to a sequence or an ordered series of binary bits (e.g., each binary bit representing a variable either reflecting a one (1) or a zero (0) value) representing a portion of the data forming a data stream.

Hereinafter, a subset (i.e., Steps 214, 216, 218, 222, 224, 226, 228, 230, 232, 234, 236, 238, 242, 244, 246, 248, 250, 252, 254, 256, 260, 262, 264, 266, 268, 270, 272, 274, 276, 280, 282, 284, 286, 288, 290, 292, and 294) of the remaining steps is performed, in series or in parallel, for each stream chunk (obtained via partitioning in Step 212).

In Step 214, a chunk bin-map, for the stream chunk, is initialized. In one or many embodiment(s) described herein, the chunk bin-map may refer to a data structure (e.g., a vector or an array) that captures an approximate probability distribution of a set of chunk segment fingerprints (described below—see e.g., Step 218) for chunk segments (described below—see e.g., Step 216) belonging to the stream chunk.

The chunk bin-map, accordingly, may be defined or described through: (a) a set of bins (e.g., vector/array elements), where the number of bins forming the set of bins may be derived from the set-bits cardinality (obtained in Step 206) or, more specifically, through the mathematical expression $2^C$, where C equals the set-bits cardinality; (b) a different C-bit value, from a set of possible C-bit values, associated with or mapped to each bin in the set of bins; and a separate bin value, associated with or mapped to each bin in the set of bins, where any bin value may represent a counter indicating a frequency of fingerprint bit selections (described below—see e.g., Step 222), for any chunk segment(s) belonging to the stream chunk, that match the C-bit value associated with or mapped to a corresponding bin. An example chunk bin-map is illustrated and described below with respect to FIG. 4C.

In Step 216, the stream chunk is partitioned into chunk segments. In one or many embodiment(s) described herein, any chunk segment across the stream chunks may be of a predetermined, uniform size (e.g., eight (8) KB). Further, any chunk segment may refer to a sequence or an ordered series of binary bits (e.g., each binary bit representing a variable either reflecting a one (1) or a zero (0) value) representing a portion of the data forming a stream chunk.

Hereinafter, another subset (i.e., Steps 218, 222, 224, and 226) of the remaining steps is performed, in series or in parallel, for each chunk segment (obtained via partitioning in Step 216).

In Step 218, a chunk segment fingerprint is generated for the chunk segment. In one or many embodiment(s) described herein, the chunk segment fingerprint may refer to a hash digest or a hash value produced through processing of the chunk segment using any existing hash function (e.g., any of the Secure Hash Algorithm series (SHA-1, SHA-2, SHA-3)). The chunk segment fingerprint may be expressed as a sequence or an ordered series of binary bits (e.g., each binary bit representing a variable either reflecting a one (1) or a zero (0) value) representing mapped data produced by the hash function given the chunk segment as input.

Figure 2B:
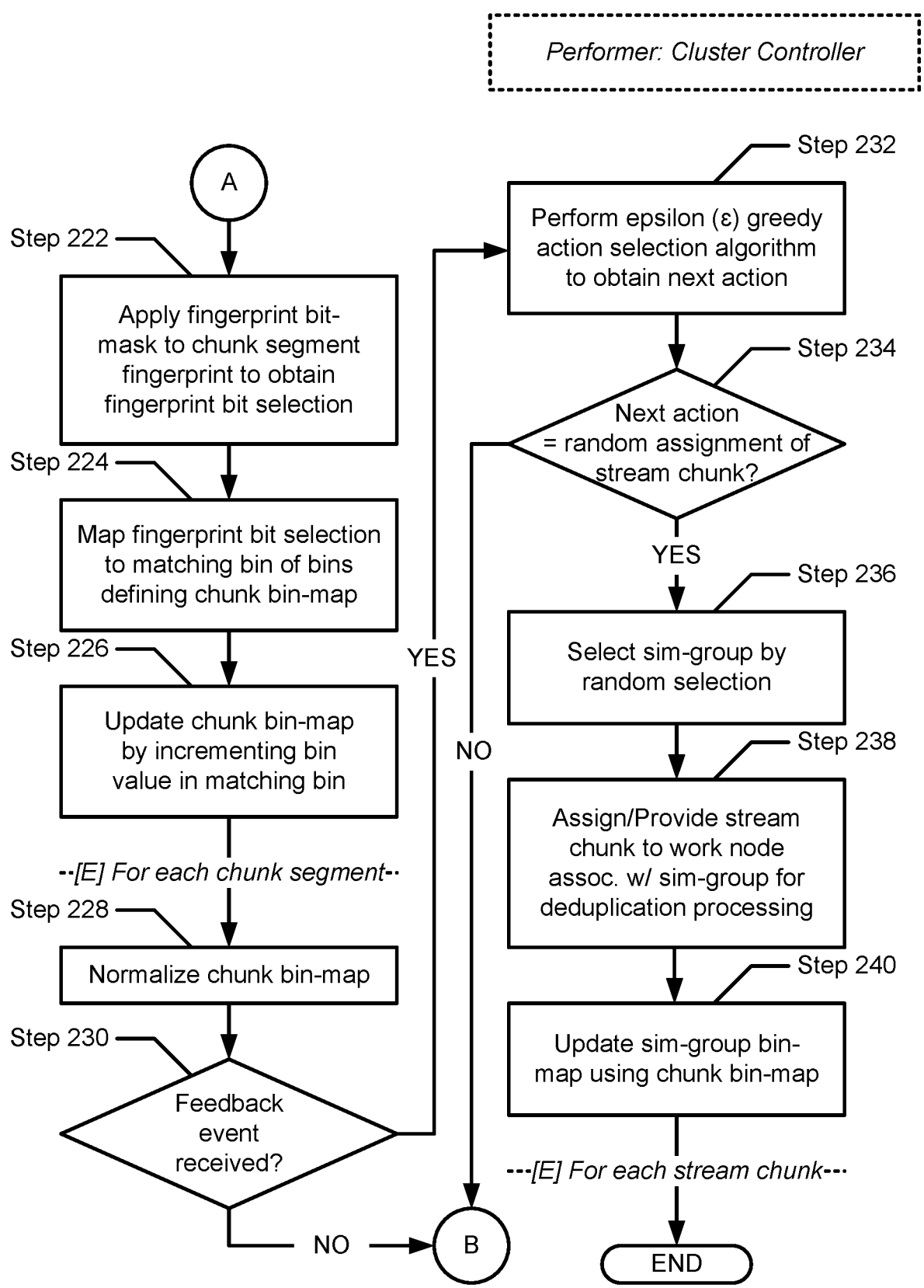

Turning to FIG. 2B, in Step 222, the fingerprint bit-mask (obtained in Step 204) is applied to the chunk segment fingerprint (generated in Step 218). In one or many embodiment(s) described herein, said application may entail performing a bit-wise AND operation between the fingerprint bit-mask and the chunk segment fingerprint. Further, through said application, one or more specific bits amongst the chunk segment fingerprint, which match the bit position(s) of the set-bit(s) amongst the fingerprint bit-mask, may be identified. Once identified, a value for each of the said specific bit(s) may be concatenated to produce/obtain a fingerprint bit selection. The fingerprint bit selection, therefore, may refer to a sequence or an ordered series of binary bits (e.g., each binary bit representing a variable either reflecting a one (1) or a zero (0) value) representing at least a portion of the data forming the chunk segment fingerprint. For example, when considering a fingerprint bit-mask of 11001001 and a chunk segment fingerprint of 10100011: the set-bits of the fingerprint bit-mask are in the first, second, fifth, and eight bit-positions (from left to right); and the identified values corresponding to these bit-positions (from left to right) in the chunk segment fingerprint are 1001, which represent the fingerprint bit selection.

In Step 224, the fingerprint bit selection (obtained in Step 222) is mapped to a matching bin, at least in part, defining or forming the chunk bin-map (initialized in Step 214 or updated in Step 226 (described below)). In one or many embodiment(s) described herein, the matching bin may refer to a bin, in the set of bins of the chunk bin-map, that may be associated with a C-bit value (where C equals the set-bits cardinality (obtained in Step 206)), in the set of possible C-bit values, that matches the fingerprint bit selection. An example of said mapping is illustrated and described with respect to FIG. 4G, below.

In Step 226, the chunk bin-map (initialized in Step 214 or updated in a previous iteration of Step 226) is updated. Particularly, in one or many embodiment(s) described herein, said updating may entail incrementing a bin value, associated with or mapped to the matching bin (identified in Step 224), by one.

Hereinafter, in one or many embodiment(s) described herein, if all chunk segments (obtained in Step 216) of the stream chunk (obtained in Step 212) had been subjected to chunk segment processing (i.e., Steps 218, 222, 224, and 226), then the method proceeds to Step 228. On the other hand, in one or many other embodiment(s) described herein, if at least one chunk segment of the stream chunk has yet to undergo chunk segment processing, then the method alternatively proceeds to Step 218, where a next chunk segment of the chunk segments (obtained in Step 216) commences chunk segment processing.

In Step 228, the chunk bin-map (updated in Step 226) is normalized. In one or many embodiment(s) described herein, statistical normalization may refer to the transformation of a dataset (e.g., chunk bin-map) such that any variations (or values) exhibited by the dataset ultimately falls between zero (0) and one (1).

In Step 230, a determination is made as to whether a feedback event has been received. A feedback event may refer to an occurrence involving the submission of an alert or notice from any work node (or more specifically, from a cluster controller agent installed thereon) to the cluster controller. Said alert/notice may be triggered by a state or a metric, concerning the work node, meeting a respective criterion. By way of examples, said state or metric may include: a data deduplication efficiency (or ratio); computer processor utilization; input-output (IO) operations per second (IOPS); and data access latency. Further, said various state and metrics are not limited to the aforementioned specific examples. Said criterion, respective to a monitored data deduplication efficiency, for example, may reflect a certain data deduplication efficiency threshold, where the feedback event may be triggered as a result of the monitored data deduplication efficiency falling below the data deduplication efficiency threshold.

As such, in one or many embodiment(s) described herein, if it is determined that a feedback event has been received, then the method proceeds to Step 232. On the other hand, in one or many other embodiment(s) described herein, if it is alternatively determined that a feedback event has not been received, then the method alternatively proceeds to Step 244 (see e.g., FIG. 2C). Moreover, although the determination is presented in the flowchart as transpiring after a chunk bin-map has been updated for every chunk segment (obtained in Step 216), one of ordinary skill will appreciate that said determination (and thus said triggering of an alert/notice to the cluster controller) may transpire at any time following an initial monitoring of the set of work nodes (see e.g., Step 202).

In Step 232, following the determination (made in Step 230) that a feedback event has indeed been received, an epsilon (ε)—greedy action selection algorithm is performed. In one or many embodiment(s) described herein, the E-greedy action selection algorithm may generally represent a reinforcement learning based decision making algorithm, which may also be referred to in artificial intelligence circles as the multi-armed bandit algorithm. In said algorithm, an agent chooses between a best known (or optimal) action and a random action based at least on a relationship between a randomized variable n, expressed as a numerical value between zero (0) and one (1), and a probability value e directed to choosing the random action. The probability value ε, however, is typically set as a low value (e.g., $0.01 \le \varepsilon \le 0.1$), thereby ensuring that the optimal action is chosen with more frequency while also providing a small chance for the random action to be chosen. Regarding the aforementioned relationship: the random action is chosen if $n<\varepsilon$, otherwise the optimal action is chosen.

Concerning embodiments described herein, the optimal action may be represented via assignment of the stream chunk (obtained in Step 212) to an optimal sim-group (or work node) based on one or more factors (described in more detail below), whereas the random action may be represented via assignment of the stream chunk to a random sim-group (or work node) (which may include the optimal sim-group or work node). Thus, summarily, in performing the ε-greedy action selection algorithm, a next action may be obtained, which may entail either the optimal action or the random action.

In Step 234, a determination is made as to whether the next action (obtained in Step 232) is directed to the assignment of the stream chunk (obtained in Step 212) to a random sim-group (or work node) (e.g., a random action). In one or many embodiment(s) described herein, if it is determined that the next action is to assign the stream chunk to a randomly selected sim-group (or work node), then the method proceeds to Step 236. On the other hand, in one or many other embodiment(s) described herein, if it is alternatively determined that the next action is to assign the stream chunk to an optimally selected sim-group (or work node), then the method alternatively proceeds to Step 244 (see e.g., FIG. 2C).

In Step 236, following the determination (made in Step 234) that the next action (obtained in Step 232) is to assign the stream chunk (obtained in Step 212) to a randomly selected sim-group (or work node), a sim-group is selected through random selection. In one or many embodiment(s) described herein, said random selection may employ any existing algorithm configured to randomly select one option (e.g., a sim-group) from a set of options (e.g., a set of sim-groups).

In Step 238, the stream chunk (obtained in Step 212) is assigned to the sim-group (selected in Step 236). More specifically, in one or many embodiment(s) described herein, the stream chunk may be provided to the work node associated with the sim-group whereon, at the work node, the stream chunk undergoes data deduplication.

In Step 240, a sim-group bin-map, for the sim-group (selected in Step 236), is updated. In one or many embodiment(s) described herein, said updating may entail performing a bin-wise summation of the bin values for each same bin between the sim-group bin-map and the chunk bin-map (normalized in Step 228) for the stream chunk. An example of said bin-wise summation is illustrated and described with respect to FIG. 4H, below. Further, following said updating of the sim-group bin-map, the updated sim-group bin-map is subjected to normalization. Statistical normalization may refer to the transformation of a dataset (e.g., sim-group bin-map) such that any variations (or values) exhibited by the dataset ultimately falls between zero (0) and one (1)

Hereinafter, in one or many embodiment(s) described herein, if at least one stream chunk (obtained in Step 212) of the data stream(s) (received in Step 210) has yet to undergo one of the possible pipelines of stream chunk processing (e.g., Pipeline 1: Steps 214, 216, 218, 222, 224, 226, 228, 230, 232, 234, 236, 238, and 240; Pipeline 2: Steps 214, 216, 218, 222, 224, 226, 228, 230, 244, 246, 248, 250, 252, 254, and 256; Pipeline 3: Steps 214, 216, 218, 222, 224, 226, 228, 230, 244, 246, 248, 256, 260, 262, 264, 266, 268, 270, 272, and 274; Pipeline 4: Steps 214, 216, 218, 222, 224, 226, 228, 230, 244, 246, 248, 256, 260, 262, 264, 274, 276, 280, 282, 284, 285, 288, 290, 292, and 294; or Pipeline 5: Steps 214, 216, 218, 222, 224, 226, 228, 230, 244, 246, 248, 256, 260, 262, 264, 274, 276, 280, 282, 284, 286, 296, 290, 292, and 294), then the method proceeds to Step 214, where a next stream chunk of the stream chunks (obtained in Step 212) commences stream chunk processing. On the other hand, unless a failure or a disaster befalls the system (see e.g., FIG. 1), the method may continue to cycle back to Step 212 (where additional stream chunks may be obtained) following the end of any stream chunk processing pipeline as the data stream(s) (received in Step 210) are continuous and never-ending.

Figure 2C:
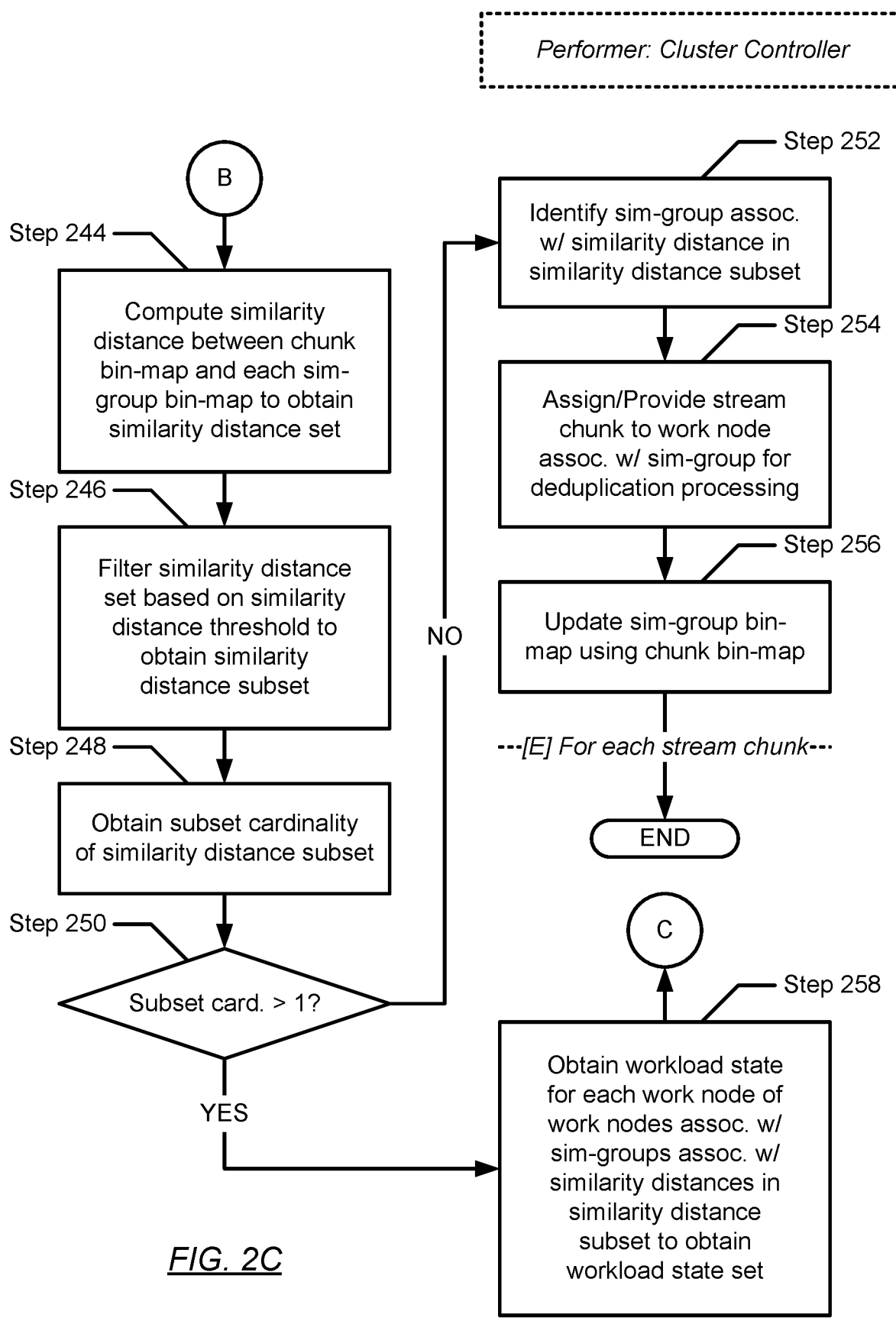

Turning to FIG. 2C, in Step 244, following the alternate determination (made in Step 230) that a feedback event has not been received, or following the alternate determination (made in Step 234) that a next action (obtained in Step 232) is to assign the stream chunk (obtained in Step 212) to an optimally selected sim-group (or work node), a similarity distance set is computed. In one or many embodiment(s) described herein, any similarity distance may generally refer to a distance measure between two objects in m-dimensional space, where m denotes a number of object features describing each object. Any similarity distance may further indicate a degree of similarity between said two objects—with a smaller similarity distance being indicative that said two objects are more similar, whereas a greater similarity distance is alternatively indicative that said two objects are less similar. Further, any similarity distance may be measured using any existing similarity distance algorithm or formula—examples of which may include, but are not limited to: a Euclidean distance; a Manhattan distance; a Minkowski distance; and a Bhattacharyya distance.

In terms of embodiments described herein, each similarity distance computed amongst the similarity distance set may measure a degree of similarity between the chunk bin-map (normalized in Step 228) for the stream chunk (obtained in Step 212) and the sim-group bin-map (initialized in Step 208 or updated in Steps 240, 256, 274, or 294) for each sim-group or work node in the set of work nodes (discovered in Step 200). Further, the above-mentioned number of object features (m) for each of the chunk bin-map and any sim-group bin-map may equal the number of bins, at least in part, defining either.

In Step 246, the similarity distance set (computed in Step 244) is filtered based on a similarity distance threshold to obtain a similarity distance subset. In one or many embodiment(s) described herein, the similarity distance threshold may reference a predetermined scalar, numerical value reflecting a maximum similarity distance up to which the chunk bin-map may be considered sufficiently close (and thus similar) to any sim-group bin-map. Further, any similarity distance, in the similarity distance subset, may reflect a scalar, numerical value that equals or falls below the similarity distance threshold.

In Step 248, a subset cardinality, of the similarity distance subset (obtained in Step 246), is obtained. In one or many embodiment(s) described herein, the subset cardinality may reflect a scalar, numerical value equaling the number of similarity distances forming the similarity distance subset.

In Step 250, a determination is made as to whether the subset cardinality (obtained in Step 248) reflects a scalar, numerical value greater than one (1). In one or many embodiment(s) described herein, if it is determined that the subset cardinality equals one (1), then the method proceeds to Step 252. On the other hand, in one or many other embodiment(s) described herein, if it is alternatively determined that the subset cardinality exceeds one (1), then the method alternatively proceeds to Step 258.

In Step 252, following the determination (made in Step 250) that the subset cardinality (obtained in Step 248) equals one (1), a sim-group is identified. In one or many embodiment(s) described herein, the identified sim-group may map to the single similarity distance within the similarity distance subset (obtained in Step 246). That is, the single similarity distance may measure the degree of similarity between the chunk bin-map (normalized in Step 228) for the stream chunk (obtained in Step 212) and the sim-group bin-map (initialized in Step 208 or updated in Steps 240, 256, 274, or 294) for the identified sim-group.

In Step 254, the stream chunk (obtained in Step 212) is assigned to the sim-group (identified in Step 252). More specifically, in one or many embodiment(s) described herein, the stream chunk may be provided to the work node associated with the sim-group whereon, at the work node, the stream chunk undergoes data deduplication.

In Step 256, the sim-group bin-map, for the sim-group (identified in Step 252), is updated. In one or many embodiment(s) described herein, said updating may entail performing a bin-wise summation of the bin values for each same bin between the sim-group bin-map and the chunk bin-map (updated in Step 226) for the stream chunk. An example of said bin-wise summation is illustrated and described with respect to FIG. 4H, below. Further, following said updating of the sim-group bin-map, the updated sim-group bin-map is subjected to normalization. Statistical normalization may refer to the transformation of a dataset (e.g., sim-group bin-map) such that any variations (or values) exhibited by the dataset ultimately falls between zero (0) and one (1)

Hereinafter, in one or many embodiment(s) described herein, if at least one stream chunk (obtained in Step 212) of the data stream(s) (received in Step 210) has yet to undergo one of the possible pipelines of stream chunk processing (e.g., Pipeline 1: Steps 214, 216, 218, 222, 224, 226, 228, 230, 232, 234, 236, 238, and 240; Pipeline 2: Steps 214, 216, 218, 222, 224, 226, 228, 230, 244, 246, 248, 250, 252, 254, and 256; Pipeline 3: Steps 214, 216, 218, 222, 224, 226, 228, 230, 244, 246, 248, 256, 260, 262, 264, 266, 268, 270, 272, and 274; Pipeline 4: Steps 214, 216, 218, 222, 224, 226, 228, 230, 244, 246, 248, 256, 260, 262, 264, 274, 276, 280, 282, 284, 285, 288, 290, 292, and 294; or Pipeline 5: Steps 214, 216, 218, 222, 224, 226, 228, 230, 244, 246, 248, 256, 260, 262, 264, 274, 276, 280, 282, 284, 286, 296, 290, 292, and 294), then the method proceeds to Step 214, where a next stream chunk of the stream chunks (obtained in Step 212) commences stream chunk processing. On the other hand, unless a failure or a disaster befalls the system (see e.g., FIG. 1), the method may continue to cycle back to Step 212 (where additional stream chunks may be obtained) following the end of any stream chunk processing pipeline as the data stream(s) (received in Step 210) are continuous and never-ending.

In Step 258, following the alternate determination (made in Step 250) that the subset cardinality (obtained in Step 248) exceeds one (1), a workload state set is obtained. In one or many embodiment(s) described herein, any workload state may include one or more metrics (e.g., computer processor utilization, input-output (IO) operations per second (IOPS), etc.) descriptive of the workload currently being handled by a respective work node. As such, the workload state set may include at least two workload states each pertaining to a different work node. Furthermore, each work node, from which a workload state may be obtained, may correspond to a sim-group mapped to one of the at least two similarity distances forming the similarity distance subset (obtained in Step 248). A sim-group may map to a similarity distance by way of being associated with a sim-group bin-map that, alongside the chunk bin-map (normalized in Step 228) for the stream chunk (obtained in Step 212), had been used to compute said similarity distance (in Step 244).

Figure 2D:
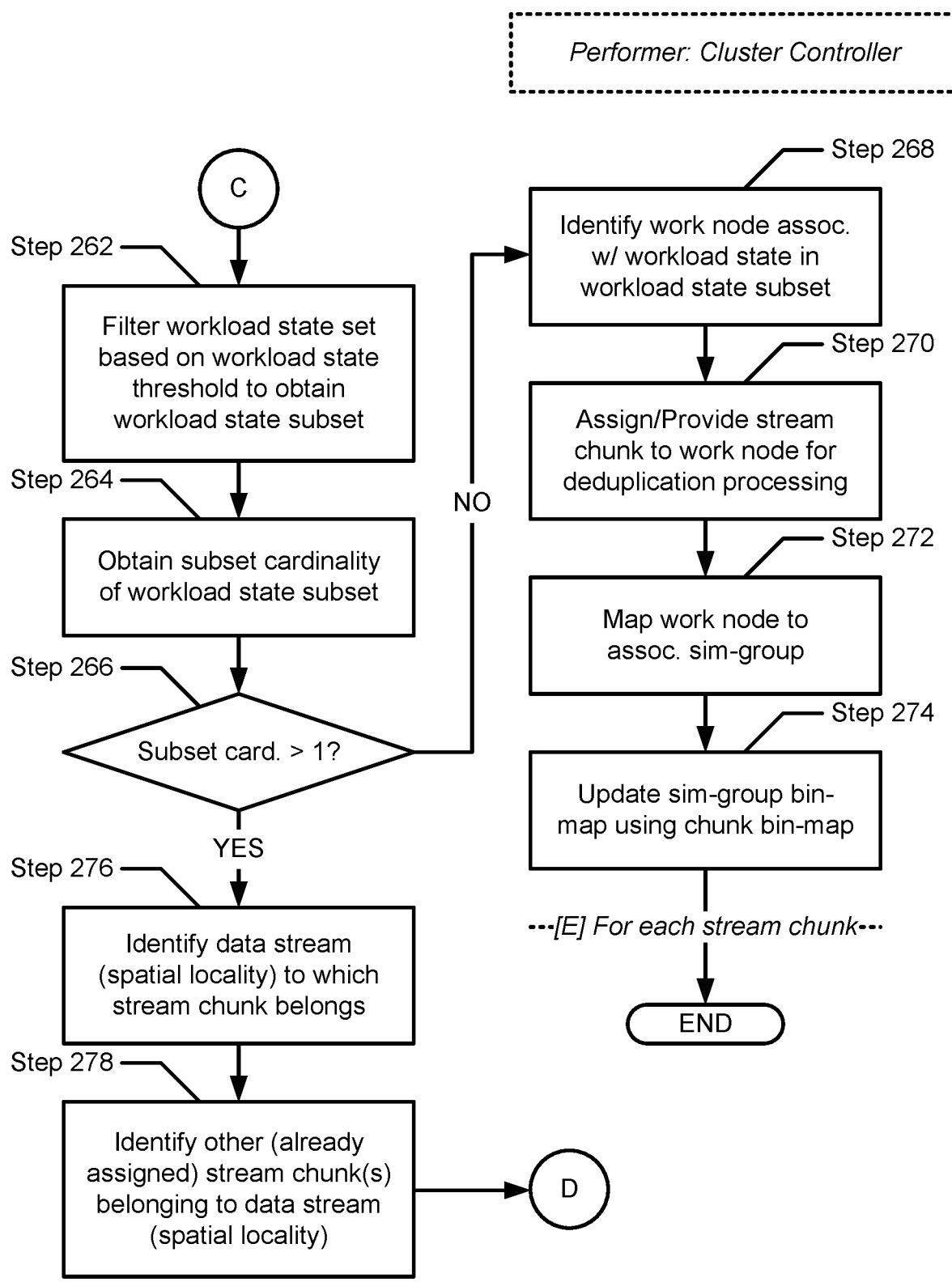

Turning to FIG. 2D, in Step 262, the workload state set (obtained in Step 258) is filtered based on one or more workload state thresholds (i.e., one per workload metric) to obtain a workload state subset. In one or many embodiment(s) described herein, any workload state threshold may reference a predetermined maximum value, in a format (e.g., scalar number, percentage, etc.) appropriate to a workload metric to which the workload state threshold corresponds, up to which a work node, at least in part, may be considered to have sufficient remaining capacity to handle more data deduplication work (e.g., via the assignment of more stream chunks thereto). Therefore, any workload state, in the workload state subset, may reflect one or more workload metrics each equaling or falling below their respective workload state threshold.

In Step 264, a subset cardinality, of the workload state subset (obtained in Step 262), is obtained. In one or many embodiment(s) described herein, the subset cardinality may reflect a scalar, numerical value equaling the number of workload states forming the workload state subset.

In Step 266, a determination is made as to whether the subset cardinality (obtained in Step 264) reflects a scalar, numerical value greater than one (1). In one or many embodiment(s) described herein, if it is determined that the subset cardinality equals one (1), then the method proceeds to Step 268. On the other hand, in one or many other embodiment(s) described herein, if it is alternatively determined that the subset cardinality exceeds one (1), then the method alternatively proceeds to Step 276.

In Step 268, following the determination (made in Step 266) that the subset cardinality (obtained in Step 264) equals one (1), a work node is identified. In one or many embodiment(s) described herein, the identified work node may map to the single workload state within the workload state subset (obtained in Step 262).

In Step 270, the stream chunk (obtained in Step 212) is provided to the work node (identified in Step 268) whereon, at the work node, the stream chunk undergoes data deduplication.

In Step 272, the work node (identified in Step 268) is mapped to a corresponding sim-group.

In Step 274, the sim-group bin-map, for the sim-group (identified in Step 272), is updated. In one or many embodiment(s) described herein, said updating may entail performing a bin-wise summation of the bin values for each same bin between the sim-group bin-map and the chunk bin-map (normalized in Step 228) for the stream chunk. An example of said bin-wise summation is illustrated and described with respect to FIG. 4H, below. Further, following said updating of the sim-group bin-map, the updated sim-group bin-map is subjected to normalization. Statistical normalization may refer to the transformation of a dataset (e.g., sim-group bin-map) such that any variations (or values) exhibited by the dataset ultimately falls between zero (0) and one (1)

Hereinafter, in one or many embodiment(s) described herein, if at least one stream chunk (obtained in Step 212) of the data stream(s) (received in Step 210) has yet to undergo one of the possible pipelines of stream chunk processing (e.g., Pipeline 1: Steps 214, 216, 218, 222, 224, 226, 228, 230, 232, 234, 236, 238, and 240; Pipeline 2: Steps 214, 216, 218, 222, 224, 226, 228, 230, 244, 246, 248, 250, 252, 254, and 256; Pipeline 3: Steps 214, 216, 218, 222, 224, 226, 228, 230, 244, 246, 248, 256, 260, 262, 264, 266, 268, 270, 272, and 274; Pipeline 4: Steps 214, 216, 218, 222, 224, 226, 228, 230, 244, 246, 248, 256, 260, 262, 264, 274, 276, 280, 282, 284, 285, 288, 290, 292, and 294; or Pipeline 5: Steps 214, 216, 218, 222, 224, 226, 228, 230, 244, 246, 248, 256, 260, 262, 264, 274, 276, 280, 282, 284, 286, 296, 290, 292, and 294), then the method proceeds to Step 214, where a next stream chunk of the stream chunks (obtained in Step 212) commences stream chunk processing. On the other hand, unless a failure or a disaster befalls the system (see e.g., FIG. 1), the method may continue to cycle back to Step 212 (where additional stream chunks may be obtained) following the end of any stream chunk processing pipeline as the data stream(s) (received in Step 210) are continuous and never-ending.

In Step 276, following the alternate determination (made in Step 266) that the subset cardinality (obtained in Step 264) exceeds one (1), a data stream is identified. In one or many embodiment(s) described herein, the data stream may be one of the data stream(s) (received in Step 210). Further, the stream chunk (obtained in Step 212) may belong to, or had been a part of, the data stream prior to its partitioning therefrom. As such, the data stream may represent a spatial locality associated with the stream chunk. Spatial locality, in turn, may generally refer to an assumption in data access behavior which specifies that any data located close to any recently accessed data has a higher likelihood of being accessed themselves.

Therefore, in one or many embodiment(s) described herein, if assignment of the stream chunk is inconclusive based on similarity distance measures and workload metrics, then the stream chunk should be assigned to the same work node to which other stream chunk(s), also belonging to the identified data stream, has/have been assigned. By assigning any stream chunks (or at least a majority thereof), which belong to or derive from a same data stream, to a same work node, a spatial locality applied to the stream chunks may be maintained when said streams chunks are transferred from said same data stream to said same work node.

In Step 278, any number of other stream chunks, each of which have already been assigned, is/are identified. In one or many embodiment(s) described herein, the other stream chunk(s) each belong to, or had been a part of, the data stream (identified in Step 276), similar to the stream chunk (obtained in Step 212), prior to their partitioning therefrom.

Figure 2E:
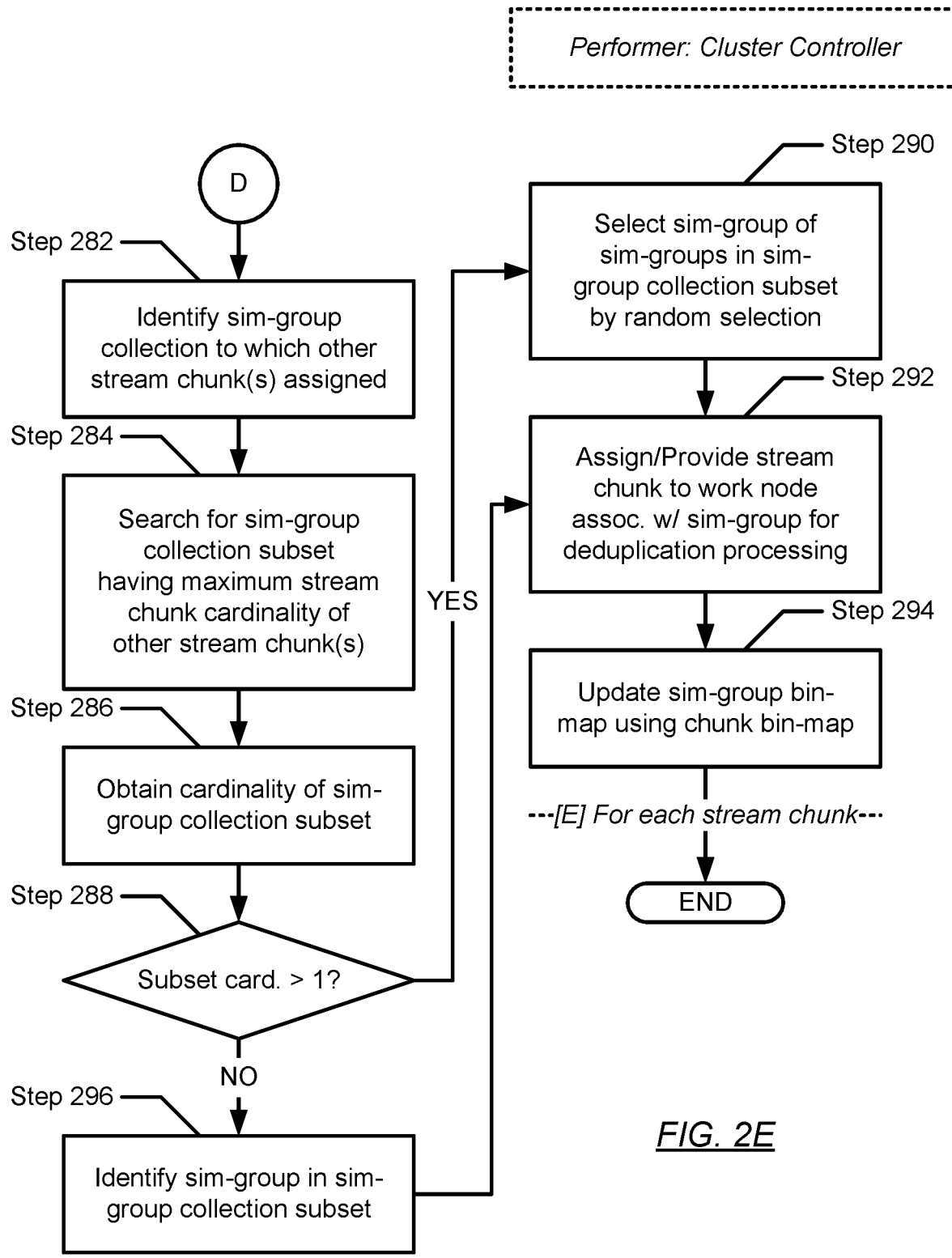

Turning to FIG. 2E, in Step 282, a sim-group collection is identified. In one or many embodiment(s) described herein, the sim-group collection may refer to, and thus include, one or more sim-groups to which the other stream chunk(s) (identified in Step 278) had been assigned.

In Step 284, within the sim-group collection (identified in Step 282), a sim-group collection subset is searched for. That is, in one or many embodiment(s) described herein, the sought sim-group collection subset may include one or more sim-groups, from the sim-group collection, that each reflect a maximum stream chunk cardinality of the other stream chunk(s) (identified in Step 278). The maximum stream chunk cardinality may refer to a scalar, numerical value equaling a highest number of the other stream chunk(s) assigned across the sim-group collection.

For example, consider that the sim-group collection includes five (5) sim-groups: sim-group 1, sim-group 2, sim-group 3, sim-group 4, and sim-group 5. In said example, the number (or cardinality) of the other stream chunk(s) assigned, respectively, to each sim-group is found to be: 1, 3, 1, 1, and 2. In this case, the maximum stream chunk cardinality, which reflects the highest number of the other stream chunk(s) assigned across the sim-group collection, is 3 other stream chunks, which corresponds to sim-group 2. The sim-group collection subset here thus only includes sim-group 2.

By way of another example, consider the same sim-group collection from the previous example, however, the number (or cardinality) of the other stream chunk(s) assigned, respectively, to each sim-group is now found to be: 2, 5, 3, 1, and 5. In this case, the maximum stream chunk cardinality, which reflects the highest number of the other stream chunk(s) assigned across the sim-group collection, is 5 other stream chunks, which corresponds to sim-group 2 and sim-group 5. The sim-group collection subset here thus includes sim-group 2 and sim-group 5.

In Step 286, a cardinality of the sim-group collection subset is obtained. In one or many embodiment(s) described herein, said cardinality may reflect a scalar, numerical value equaling the number of sim-groups forming the sim-group collection subset (searched for in Step 284). Further, said number of sim-groups may include at least a portion of the sim-group(s) forming the sim-group collection (identified in Step 282).

In Step 288, a determination is made as to whether the cardinality of the sim-group collection subset (obtained in Step 286) reflects a scalar, numerical value greater than one (1). In one or many embodiment(s) described herein, if it is determined that the subset cardinality exceeds one (1), then the method proceeds to Step 290. On the other hand, in one or many other embodiment(s) described herein, if it is alternatively determined that the subset cardinality equals one (1), then the method alternatively proceeds to Step 296.

In Step 290, following the determination (made in Step 288) that the cardinality of the sim-group collection subset (obtained in Step 286) exceeds one (1), a sim-group, of the sim-groups forming the sim-group collection subset, is selected. In one or many embodiment(s) described herein, the sim-group may be selected through random selection. Further, said random selection may employ any existing algorithm configured to randomly select one option (e.g., the sim-group) from a set of options (e.g., the sim-group collection subset).

In Step 292, the stream chunk (obtained in Step 212) is assigned to the sim-group (selected in Step 290 or identified in Step 296). More specifically, in one or many embodiment(s) described herein, the stream chunk may be provided to the work node associated with the sim-group whereon, at the work node, the stream chunk undergoes data deduplication.

In Step 294, the sim-group bin-map, for the sim-group (selected in Step 290 or identified in Step 296), is updated. In one or many embodiment(s) described herein, said updating may entail performing a bin-wise summation of the bin values for each same bin between the sim-group bin-map and the chunk bin-map (normalized in Step 228) for the stream chunk. An example of said bin-wise summation is illustrated and described with respect to FIG. 4H, below. Further, following said updating of the sim-group bin-map, the updated sim-group bin-map is subjected to normalization. Statistical normalization may refer to the transformation of a dataset (e.g., sim-group bin-map) such that any variations (or values) exhibited by the dataset ultimately falls between zero (0) and one (1)

Hereinafter, in one or many embodiment(s) described herein, if at least one stream chunk (obtained in Step 212) of the data stream(s) (received in Step 210) has yet to undergo one of the possible pipelines of stream chunk processing (e.g., Pipeline 1: Steps 214, 216, 218, 222, 224, 226, 228, 230, 232, 234, 236, 238, and 240; Pipeline 2: Steps 214, 216, 218, 222, 224, 226, 228, 230, 244, 246, 248, 250, 252, 254, and 256; Pipeline 3: Steps 214, 216, 218, 222, 224, 226, 228, 230, 244, 246, 248, 256, 260, 262, 264, 266, 268, 270, 272, and 274; Pipeline 4: Steps 214, 216, 218, 222, 224, 226, 228, 230, 244, 246, 248, 256, 260, 262, 264, 274, 276, 280, 282, 284, 285, 288, 290, 292, and 294; or Pipeline 5: Steps 214, 216, 218, 222, 224, 226, 228, 230, 244, 246, 248, 256, 260, 262, 264, 274, 276, 280, 282, 284, 286, 296, 290, 292, and 294), then the method proceeds to Step 214, where a next stream chunk of the stream chunks (obtained in Step 212) commences stream chunk processing. On the other hand, unless a failure or a disaster befalls the system (see e.g., FIG. 1), the method may continue to cycle back to Step 212 (where additional stream chunks may be obtained) following the end of any stream chunk processing pipeline as the data stream(s) (received in Step 210) are continuous and never-ending.

In Step 296, following the alternate determination (made in Step 266) that the cardinality of the sim-group collection subset (obtained in Step 286) equals one (1), the single sim-group, forming the sim-group collection subset (searched for in Step 284), is identified.

Hereinafter, the method proceeds to Step 292 (described above).

Figure 3:
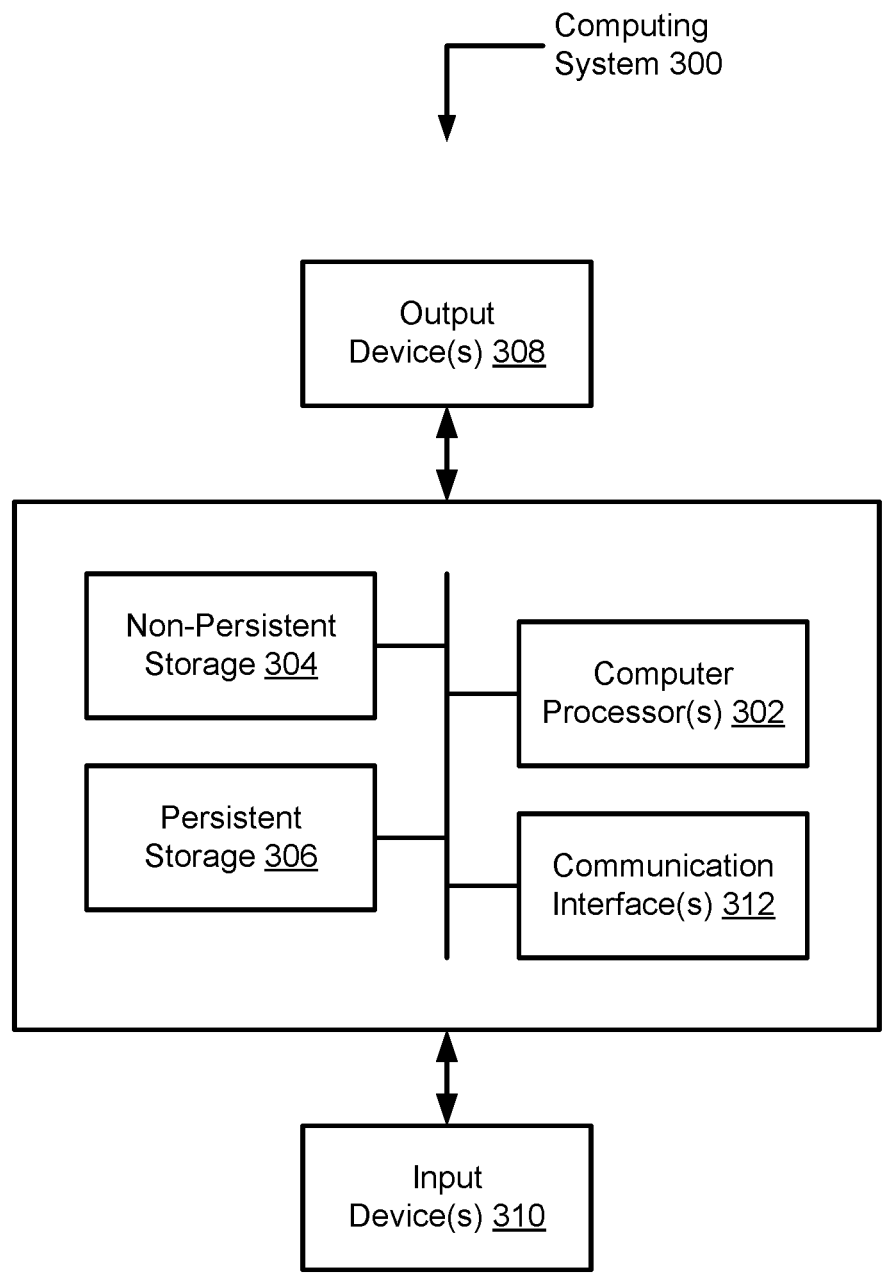
FIG. 3 shows a computing system in accordance with one or more embodiments described herein.

FIG. 3 shows a computing system in accordance with one or more embodiments described herein. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (6312) (e.g., Bluetooth interface, infrared interface, network interface, optical interface, etc.), input devices (310), output devices (308), and numerous other elements (not shown) and functionalities. Each of these components is described below.

In one or many embodiment(s) described herein, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one or many embodiment(s) described herein, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or many embodiment(s) described herein.

FIGS. 4A-4H show an example scenario in accordance with one or more embodiments described herein. The example scenario presented in conjunction with components illustrated in FIGS. 4A-4H is for explanatory purposes only and not intended to limit the embodiments described herein.

Concerning the example scenario, consider the example system (400) illustrated in FIG. 4A as the setting. The example system (400) includes two (2) data sources—i.e. Data Source 1 (402A) and Data Source 2 (402B)—operatively connected to a Cluster Controller (404), which in turn is operatively connected to a Deduplication Work Cluster (408) including three (3) work nodes—i.e., Work Node 1 (406A), Work Node 2 (406B), and Work Node 3 (406C). As for operations, each data source (402A, 402B) transmits a continuous flow of its respective data as a data stream to the Cluster Controller (404), where the latter then assigns said data, to undergo data deduplication processing, to the work nodes (406A-406C) per embodiments described herein.

To the extent of the embodiments described herein, prior to processing any received data from the data sources (402A, 402B), the Cluster Controller (404) begins by discovering, and subsequently monitoring, each of the three work nodes (406A-406C). Thereafter, the Cluster Controller (404) obtains a fingerprint bit-mask—e.g., the example fingerprint bit-mask (410) illustrated in FIG. 4B. As presented, the example fingerprint bit-mask (410) includes sixteen (16) bits each capable of reflecting a binary value of either a one (1) or a zero (0). Further, of the sixteen (16) bits, three (3) bits—at bit positions 5, 6, and 7—each reflect the binary one (1) value, thereby designating these three (3) bits as set-bits (412).

Figure 4C:
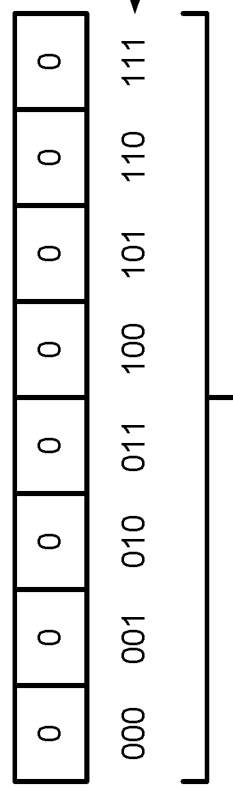

Based on a cardinality—i.e., three (3)—of the set-bits (412), the Cluster Controller (404) understands that any bin-map (see e.g., the example initialized sim-group/chunk bin-map (414) illustrated in FIG. 4C) generated and initialized hereinafter, whether for a sim-group or for a stream chunk, is defined by a number of bins equaling the mathematical expression $2^C$, where C is the said set-bits (412) cardinality. The number of bins defining any bin-map is thus $2^3=8$ bins. Each bin, further, is associated with one of a set of possible values that can be reflected, through concatenation, by the set-bits (412) of the example fingerprint bit-mask (410). Said set of possible (3-bit) values (416) includes: 000, 001, 010, 011, 100, 101, 110, and 111. In defining any bin-map (414), these possible values are arranged in a one value per bin association in ascending order from the left-most bin to the right-most bin. In completing the definition of any bin-map (414), each bin thereof is further associated with a bin value representing a counter indicating a frequency of fingerprint bit selections (exemplified below) that match the possible (3-bit) value (416) mapped to the bin.

As there are three (3) work nodes (406A-406C) each corresponding to a respective sim-group, the Cluster Controller (404) generates and initializes three (3) sim-group bin-maps each resembling, at least initially, the example initialized sim-group/chunk bin-map (414).

Figure 4D:
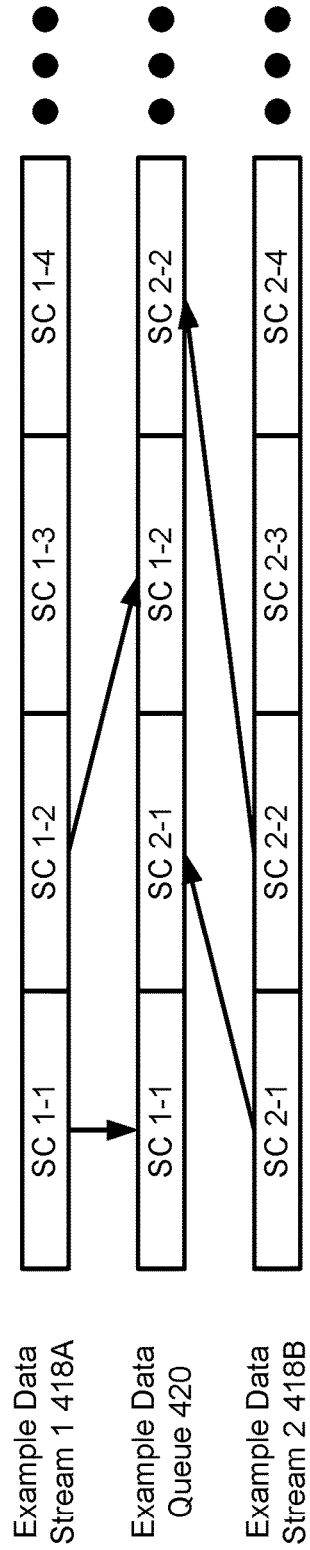

From here, and with reference to FIG. 4D, the Cluster Controller (404) commences receipt of two data streams—e.g., example data stream 1 (418A) and example data stream 2 (418B)—from the two data sources (402A, 402B), respectively. Said two data streams (418A, 418B) are each subsequently partitioned inline into stream chunks. In this example scenario, the stream chunks, from each data stream (418A, 418B), are to be processed serially by way of a single data queue—e.g., example data queue (420). Within the single data queue (420), the stream chunks, from each data stream (418A, 418B), await to be processed in an alternating order.

Figure 4E:
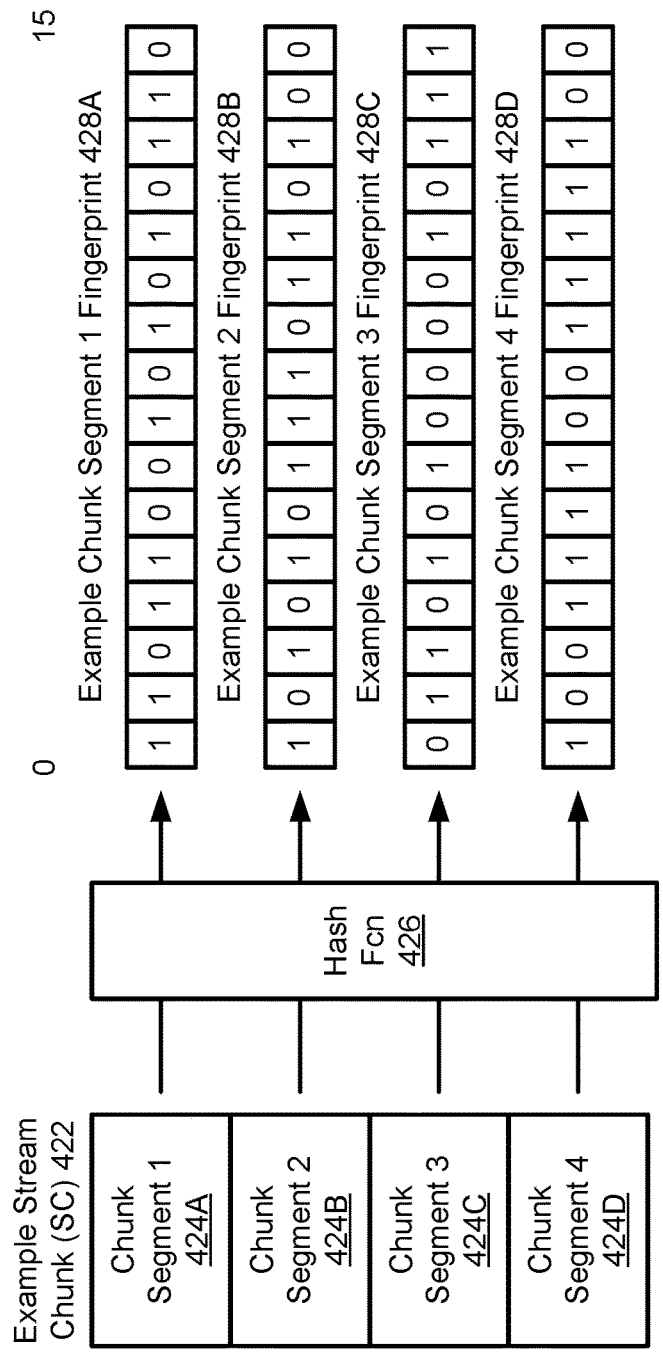

In processing any given stream chunk, the Cluster Controller (404) first generates and initializes a chunk bin-map, which, at least initially, resembles the example initialized sim-group/chunk bin-map (414). Turning to FIG. 4E, and in continuance of said processing by the Cluster Controller (404), each stream chunk—e.g., example stream chunk (422)—is partitioned into chunk segments—i.e., Chunk Segment 1 (424A), Chunk Segment 2 (424B), Chunk Segment 3 (424C), and Chunk Segment 4 (424D). Each of these chunk segments (424A-424D) is subsequently inputted into a hash function (426), thereby producing a corresponding chunk segment fingerprint (428A-428D) as the hash function (426) output.

Figure 4F:
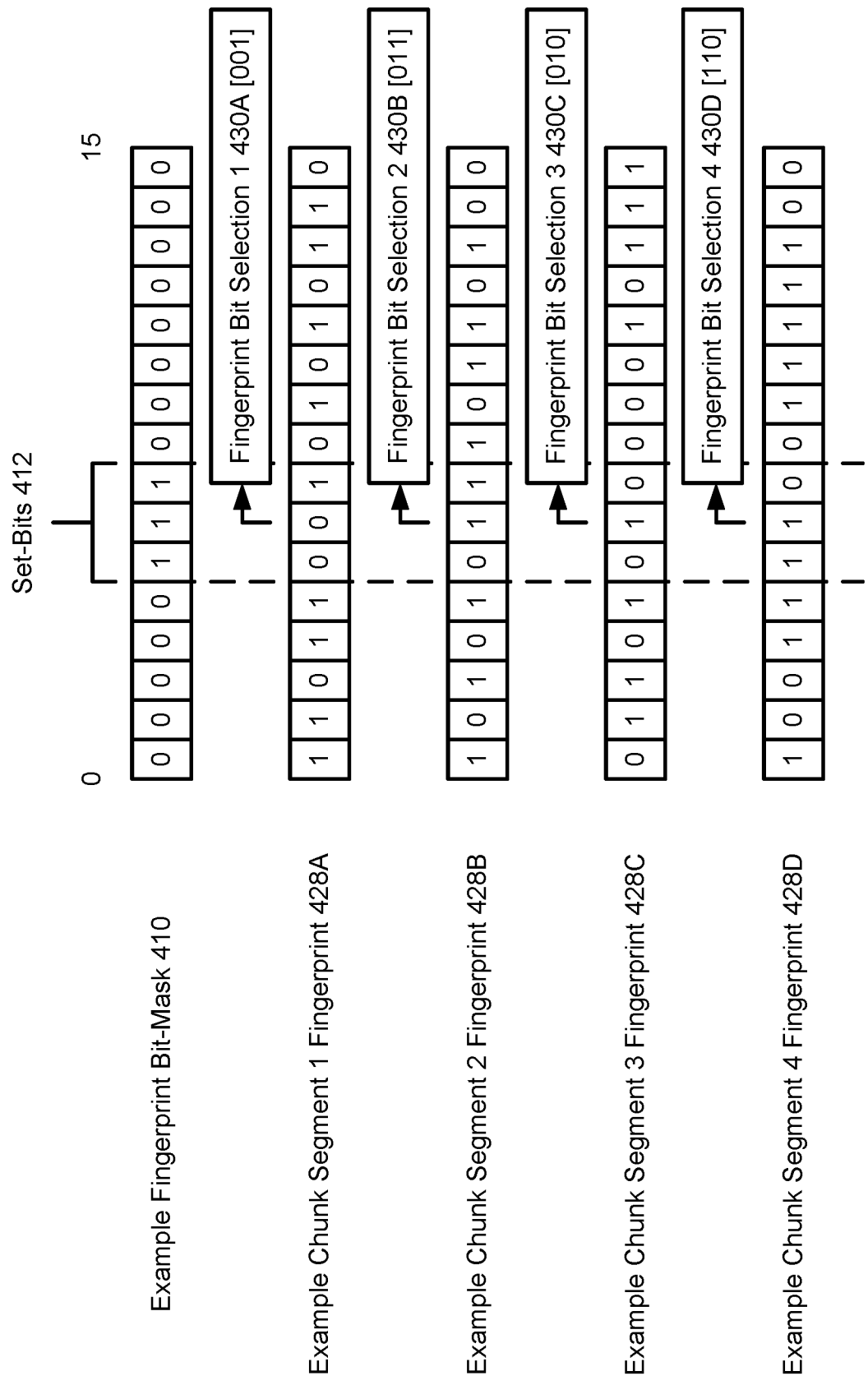

As illustrated in FIG. 4F, the Cluster Controller (404) then applies the example fingerprint bit-mask (410) to each example chunk segment fingerprint (428A-428D). Each said application entails a bit-wise AND operation between the example fingerprint bit-mask (410) and an example chunk segment fingerprint (428A-428D), which results in the identification of a fingerprint bit selection (430A-430D). Any fingerprint bit-selection (430A-430D) reflects the concatenated bit values of specific bits of a chunk segment fingerprint (428A-428D) located at the same bit positions—i.e., bit positions bit positions 5, 6, and 7—as the set-bits (412) of the fingerprint bit-mask (410). Accordingly, the fingerprint bit selections (430A-430D), respectively, for the chunk segment fingerprints (428A-428D) are: 001, 011, 010, and 110.

Figure 4G:
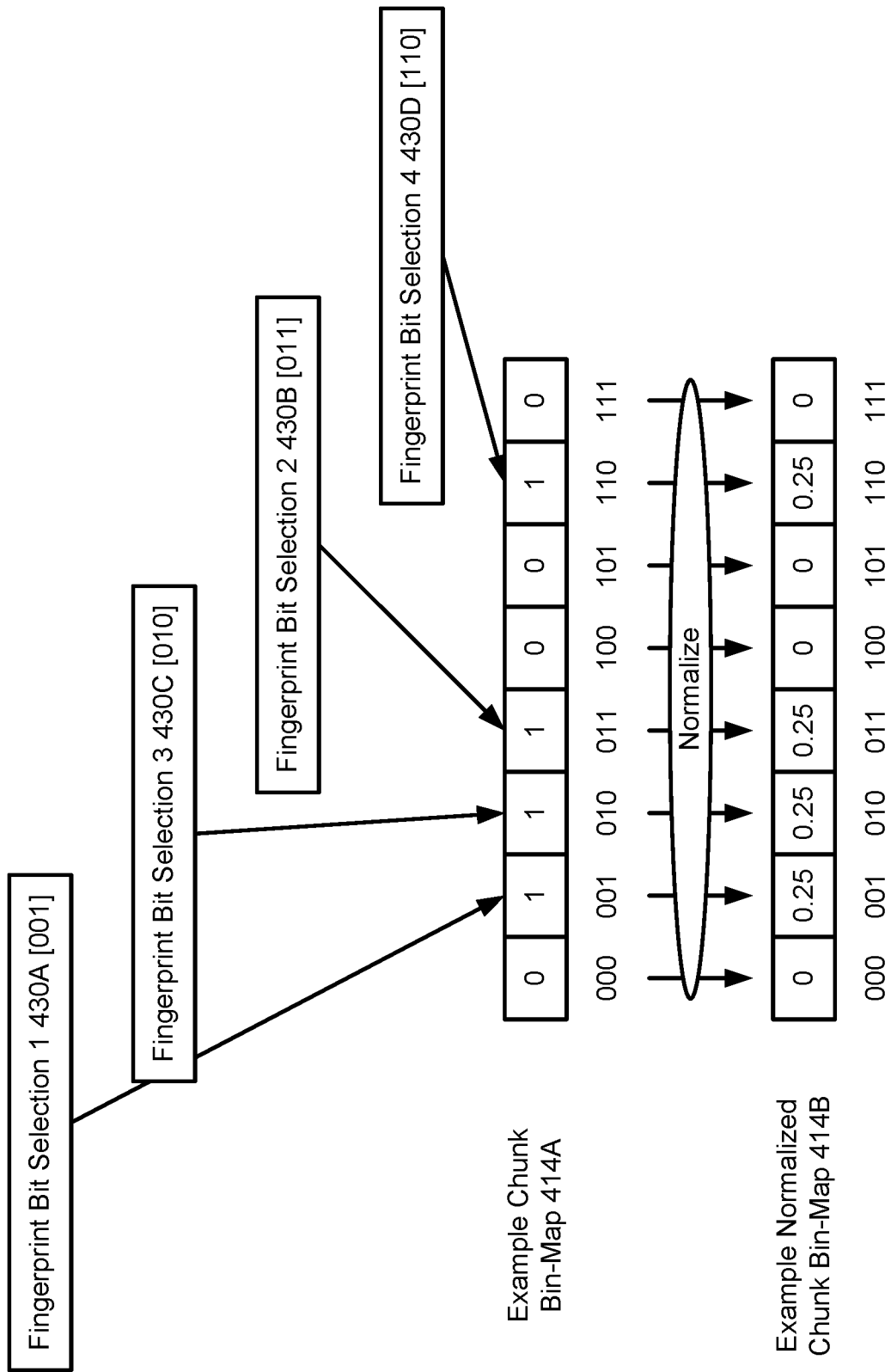

Next, as shown in FIG. 4G, the Cluster Controller (404) updates the chunk bin-map (414) for the given stream chunk (422). Said updating entails, for each fingerprint bit selection (430A-430D): mapping the fingerprint bit selection (430A-430D) to a matching bin of the 8 bins defining the chunk bin-map (414), where the matching bin is associated with a possible 3-bit value equaling the fingerprint bit selection (430A-430D); and incrementing an existing bin value of the matching bin by one. In performing the aforementioned with respect to each fingerprint bit selection (430A-430D), an updated chunk bin-map (414A) results. Thereafter, the example chunk bin-map (414A) undergoes normalization. Through said statistical normalization: all bin values (i.e., [0, 1, 1, 1, 0, 0, 1, 0]) of the chunk bin-map (414A) are summed together to obtain a bin value total (i.e., 4); and then, each bin value of the chunk bin-map (414A) is divided by the bin value total to produce a normalized chunk bin-map (414B) with normalized bin values (i.e., [0, 0.25, 0.25, 0.25, 0, 0, 0.25, 0]).

Moreover, whether based on similarity distances, workload states, spatial locality, or application of an ε-greedy action selection algorithm, the Cluster Controller (404) ultimately identifies or selects one of the three (3) sim-groups corresponding, respectively, to one of the three (3) work nodes (406A-406C). For this example scenario, assume a Sim-Group 2 is identified/selected to which the stream chunk (422) is assigned.

Figure 4H:
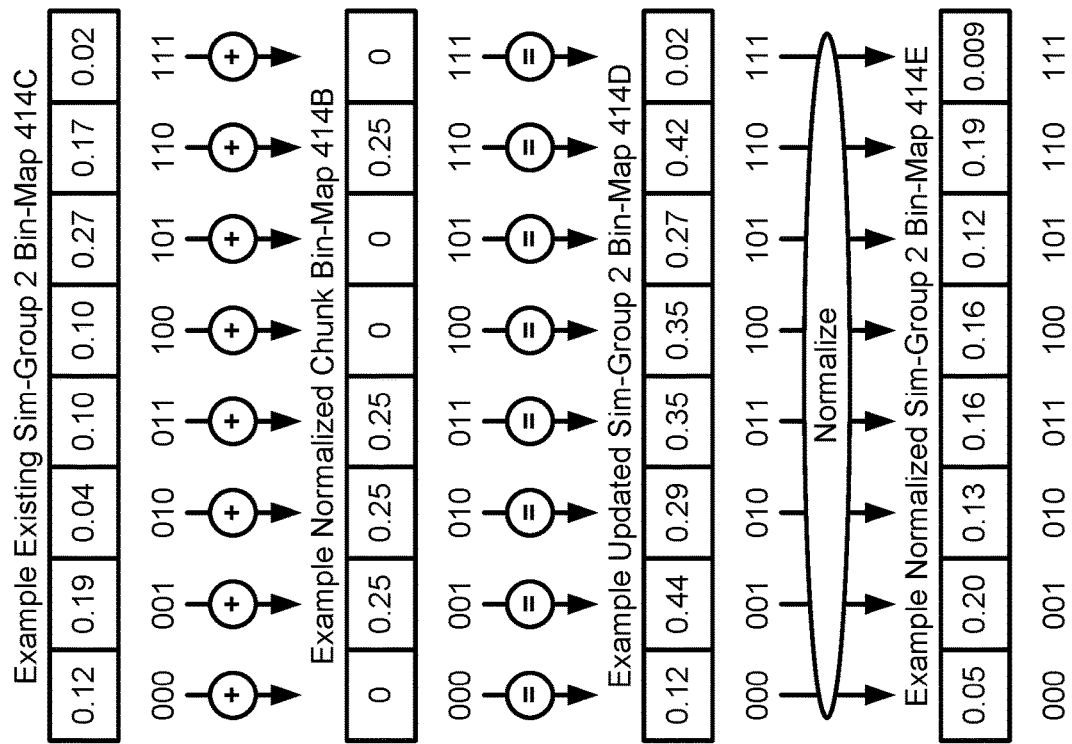

Following the previous processing of several stream chunks, an existing, normalized sim-group bin-map (414C) for Sim-Group 2 is as presented at the top of FIG. 4H. Upon the stream chunk (422) being assigned to Sim-Group 2, the existing, normalized sim-group bin-map (414C) thereof is updated using the normalized chunk bin-map (414B) for the stream chunk (422). Said updating entails a bin-wise summation of the bin values reflected in the existing, normalized Sim-Group 2 bin-map (414C) and the normalized chunk bin-map (414B), thereby resulting in an updated Sim-Group 2 bin-map (414D). Thereafter, the updated Sim-Group 2 bin-map (414D) undergoes normalization. Through said statistical normalization: all bin values (i.e., [0.12, 0.44, 0.29, 0.35, 0.35, 0.27, 0.42, 0.02]) of the updated Sim-Group 2 bin-map (414D) are summed together to obtain a bin value total (i.e., 2.26); and then, each bin value of the updated Sim-Group 2 bin-map (414D) is divided by the bin value total to produce a normalized Sim-Group 2 bin-map (414E) with normalized bin values (i.e., [0.05, 0.20, 0.13, 0.16, 0.16, 0.12, 0.19, 0.009]).

While embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for assigning data to similarity groups (sim-groups), the method comprising:
   partitioning a data stream, originating from a data source, into stream chunks; for at least a first stream chunk of the stream chunks:
      initializing a first chunk bin-map for the first stream chunk;
      partitioning the first stream chunk into first chunk segments;
      updating the first chunk bin-map based on a chunk segment processing of the first chunk segments;
      computing, to obtain a first similarity distance set, a similarity distance between the first chunk bin-map and each sim-group bin-map in a first set of sim-group bin-maps;
      identifying a first sim-group corresponding to a first similarity distance in the first similarity distance set;
      assigning the first stream chunk to the first sim-group;
      for at least a second stream chunk of the stream chunks:
         initializing a second chunk bin-map for the second stream chunk;
         partitioning the second stream chunk into second chunk segments;
         updating the second chunk bin-map based on the chunk segment processing of the second chunk segments;
         computing, to obtain a second similarity distance set, the similarity distance between the second chunk bin-map and each sim-group bin-map in a second set of sim-group bin-maps;
         filtering, based on a similarity distance threshold, the second similarity distance set to obtain a first similarity distance subset;
         based on a first subset cardinality of the first similarity distance subset exceeding one:
            obtaining a first workload state set comprising a workload state mapped to each similarity distance in the first similarity distance subset;
            identifying a second sim-group corresponding to a first workload state in the first workload state set; and
            assigning the second stream chunk to the second sim-group.

2. The method of claim 1, wherein updating the first chunk bin-map based on the chunk segment processing of the first chunk segments, comprises:
   for each chunk segment of the first chunk segments:
      generating a chunk segment fingerprint for the chunk segment;
      applying a fingerprint bit-mask to the chunk segment fingerprint to obtain a fingerprint bit selection;
      mapping the fingerprint bit selection to a matching bin in a set of bins defining the first chunk bin-map; and
      updating the first chunk bin-map by incrementing a bin value of the matching bin.

3. The method of claim 2, wherein the fingerprint bit selection comprises a bit value of at least one bit of the chunk segment fingerprint, and wherein the at least one bit of the chunk segment fingerprint aligns respectively with at least one set-bit of the fingerprint bit-mask.

4. The method of claim 3, wherein initialization of the first chunk bin-map is, at least in part, based on a set-bits cardinality of the at least one set-bit of the fingerprint bit-mask.

5. The method of claim 1, the method further comprising:
   prior to identifying the first sim-group:
      filtering, based on the similarity distance threshold, the first similarity distance set to obtain a second similarity distance subset,
      wherein the first sim-group is identified based on a second subset cardinality of the second similarity distance subset equaling one.

6. The method of claim 1, the method further comprising:
   immediately following assignment of the first stream chunk to the first sim-group:
      providing, to undergo data deduplication processing, the first stream chunk to a work node corresponding to the first sim-group; and
      updating, using the first chunk bin-map and to obtain the second set of sim-group bin-maps, a first sim-group bin-map for the first sim-group in the first set of sim-group bin-maps.

7. The method of claim 1, the method further comprising:
   for at least a third stream chunk of the stream chunks:
      initializing a third chunk bin-map for the third stream chunk;
      partitioning the third stream chunk into third chunk segments;
      updating the third chunk bin-map based on the chunk segment processing of the third chunk segments;
      computing, to obtain a third similarity distance set, the similarity distance between the third chunk bin-map and each sim-group bin-map in a third set of sim-group bin-maps;
      filtering, based on the similarity distance threshold, the third similarity distance set to obtain a second similarity distance subset;
      based on a second subset cardinality of the second similarity distance subset exceeding one:
         obtaining a second workload state set comprising the workload state mapped to each similarity distance in the second similarity distance subset;
         filtering, based on a workload state threshold, the second workload state set to obtain a first workload state subset;
         based on a third subset cardinality of the first workload state subset exceeding one:
            identifying a sim-group collection comprising each unique sim-group to which at least one stream chunk of the stream chunks has been assigned;
            obtaining, from the sim-group collection, a sim-group collection subset comprising a third sim-group associated with a maximum stream chunk cardinality; and
            assigning the third stream chunk to the third sim-group.

8. The method of claim 7, the method further comprising:
   prior to identifying the second sim-group:
      filtering, based on the workload state threshold, the first workload state set to obtain a second workload state subset,
      wherein the second sim-group is identified based on a fourth subset cardinality of the second workload state subset equaling one.

9. The method of claim 7, wherein the maximum stream chunk cardinality reflects a highest number of the stream chunks, across the sim-group collection, assigned to the sim-group collection subset.

10. The method of claim 1, the method further comprising:
prior to partitioning the data stream into the stream chunks:
discovering a set of work nodes forming a deduplication work cluster; and
monitoring the set of work nodes;
following assignment of the first stream chunk to the first sim-group:
for at least a second stream chunk of the stream chunks:
initializing a second chunk bin-map for the second stream chunk;
partitioning the second stream chunk into second chunk segments;
updating the second chunk bin-map based on the chunk segment processing of the second chunk segments;
receiving, based on monitoring the set of work nodes, a feedback event from a work node in the set of work nodes; and
in response to receiving the feedback event:
performing an epsilon ($\varepsilon$)—greedy action selection algorithm to obtain a next action selected from a group of actions comprising assignment of the second stream chunk to a random sim-group and assignment of the second stream chunk to an optimal sim-group.

11. The method of claim 10, wherein the feedback event comprises an alert informing that a data deduplication efficiency of the work node has dropped below a data deduplication efficiency threshold.

12. A non-transitory computer readable medium (CRM) comprising computer readable program code, which when executed by a computer processor, enables the computer processor to perform a method for assigning data to similarity groups (sim-groups), the method comprising:
discovering a set of work nodes forming a deduplication work cluster:
monitoring the set of work nodes:
partitioning a data stream, originating from a data source, into stream chunks;
for at least a first stream chunk of the stream chunks:
initializing a first chunk bin-map for the first stream chunk;
partitioning the first stream chunk into first chunk segments;
updating the first chunk bin-map based on a chunk segment processing of the first chunk segments;
computing, to obtain a first similarity distance set, a similarity distance between the first chunk bin-map and each sim-group bin-map in a first set of sim-group bin-maps;
identifying a first sim-group corresponding to a first similarity distance in the first similarity distance set;
assigning the first stream chunk to the first sim-group;
for at least a second stream chunk of the stream chunks:
initializing a second chunk bin-map for the second stream chunk:
partitioning the second stream chunk into second chunk segments:
updating the second chunk bin-map based on the chunk segment processing of the second chunk segments:
receiving, based on monitoring the set of work nodes, a feedback event from a work node in the set of work nodes; and
in response to receiving the feedback event:
performing an epsilon ($\varepsilon$)—greedy action selection algorithm to obtain a next action selected from a group of actions comprising assignment of the second stream chunk to a random sim-group and assignment of the second stream chunk to an optimal sim-group.

13. The non-transitory CRM of claim 12, the method further comprising:
for at least a second stream chunk of the stream chunks:
initializing a second chunk bin-map for the second stream chunk;
partitioning the second stream chunk into second chunk segments;
updating the second chunk bin-map based on the chunk segment processing of the second chunk segments;
computing, to obtain a second similarity distance set, the similarity distance between the second chunk bin-map and each sim-group bin-map in a second set of sim-group bin-maps;
filtering, based on a similarity distance threshold, the second similarity distance set to obtain a first similarity distance subset;
based on a first subset cardinality of the first similarity distance subset exceeding one:
obtaining a first workload state set comprising a workload state mapped to each similarity distance in the first similarity distance subset;
identifying a second sim-group corresponding to a first workload state in the first workload state set; and
assigning the second stream chunk to the second sim-group.

14. The non-transitory CRM of claim 13, the method further comprising:
prior to identifying the first sim-group:
filtering, based on the similarity distance threshold, the first similarity distance set to obtain a second similarity distance subset,
wherein the first sim-group is identified based on a second subset cardinality of the second similarity distance subset equaling one.

15. The non-transitory CRM of claim 13, the method further comprising:
immediately following assignment of the first stream chunk to the first sim-group:
providing, to undergo data deduplication processing, the first stream chunk to a work node corresponding to the first sim-group; and
updating, using the first chunk bin-map and to obtain the second set of sim-group bin-maps, a first sim-group bin-map for the first sim-group in the first set of sim-group bin-maps.

16. The non-transitory CRM of claim 13, the method further comprising:
for at least a third stream chunk of the stream chunks:
initializing a third chunk bin-map for the third stream chunk;
partitioning the third stream chunk into third chunk segments;
updating the third chunk bin-map based on the chunk segment processing of the third chunk segments;
computing, to obtain a third similarity distance set, the similarity distance between the third chunk bin-map and each sim-group bin-map in a third set of sim-group bin-maps;

filtering, based on the similarity distance threshold, the third similarity distance set to obtain a second similarity distance subset;
based on a second subset cardinality of the second similarity distance subset exceeding one:
  obtaining a second workload state set comprising the workload state mapped to each similarity distance in the second similarity distance subset;
  filtering, based on a workload state threshold, the second workload state set to obtain a first workload state subset;
  based on a third subset cardinality of the first workload state subset exceeding one:
    identifying a sim-group collection comprising each unique sim-group to which at least one stream chunk of the stream chunks has been assigned;
    obtaining, from the sim-group collection, a sim-group collection subset comprising a third sim-group associated with a maximum stream chunk cardinality; and
assigning the third stream chunk to the third sim-group.

17. A system, comprising:
a data source configured to continuously transmit data as a data stream; and
a cluster controller operatively connected to the data source, and comprising a computer processor configured to perform a method for assigning the data to similarity groups (sim-groups), the method comprising:
receiving the data stream from the data source;
partitioning the data stream into stream chunks;
for at least a first stream chunk of the stream chunks:
  initializing a first chunk bin-map for the first stream chunk;
  partitioning the first stream chunk into first chunk segments;
  updating the first chunk bin-map based on a chunk segment processing of the first chunk segments;
  computing, to obtain a first similarity distance set, a similarity distance between the first chunk bin-map and each sim-group bin-map in a first set of sim-group bin-maps;
  identifying a first sim-group corresponding to a first similarity distance in the first similarity distance set;
  assigning the first stream chunk to the first sim-group;
for at least a second stream chunk of the stream chunks:
  initializing a second chunk bin-map for the second stream chunk;
  partitioning the second stream chunk into second chunk segments;
  updating the second chunk bin-map based on the chunk segment processing of the second chunk segments;
  computing, to obtain a second similarity distance set, the similarity distance between the second chunk bin-map and each sim-group bin-map in a second set of sim-group bin-maps;
  filtering, based on a similarity distance threshold, the second similarity distance set to obtain a first similarity distance subset;
  based on a first subset cardinality of the first similarity distance subset exceeding one:
    obtaining a first workload state set comprising a workload state mapped to each similarity distance in the first similarity distance subset;
    identifying a second sim-group corresponding to a first workload state in the first workload state set; and
    assigning the second stream chunk to the second sim-group.

18. The system of claim 17, further comprising:
a deduplication work cluster operatively connected to the cluster controller, and comprising a plurality of work nodes each configured to perform data deduplication processing,
wherein the method further comprises:
  providing, to undergo the data deduplication processing, the first stream chunk to a work node, in the plurality of work nodes, corresponding to the first sim-group; and
  updating, using the first chunk bin-map and to obtain a second set of sim-group bin-maps, a first sim-group bin-map for the first sim-group in the first set of sim-group bin-maps.

* * * * *